Dec. 10, 1968  P. THIESSEN  3,415,541
TANDEM HITCH
Filed May 25, 1967  3 Sheets-Sheet 2
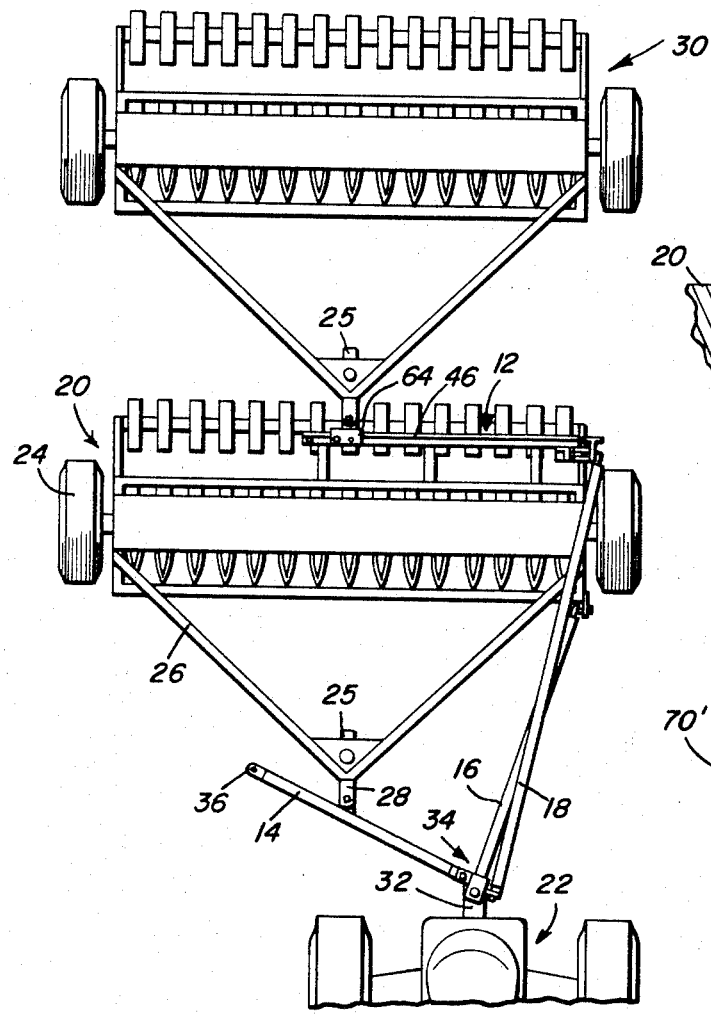
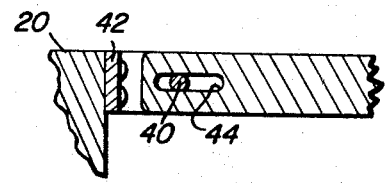
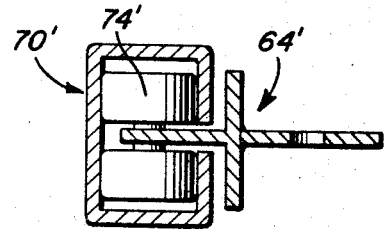
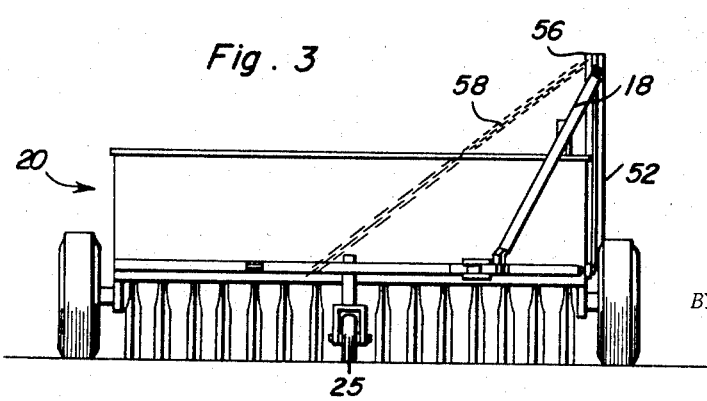
Pete Thiessen
INVENTOR.
BY *Clarence A. O'Brien*
*and Harvey B. Jacobson*
Attorneys Dec. 10, 1968  P. THIESSEN  3,415,541
TANDEM HITCH
Filed May 25, 1967  3 Sheets-Sheet 3
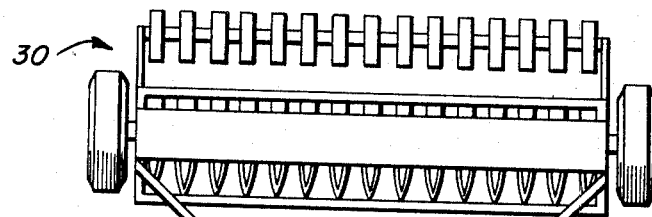
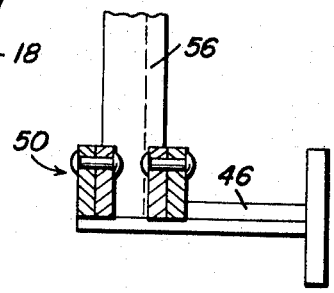
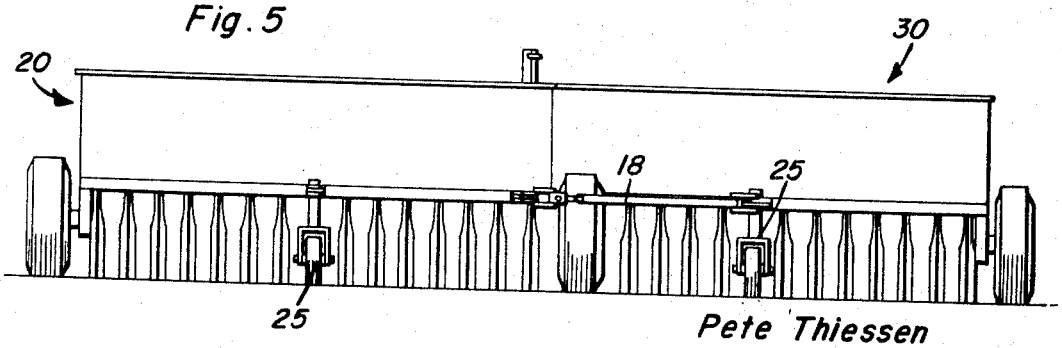
Pete Thiessen
INVENTOR.

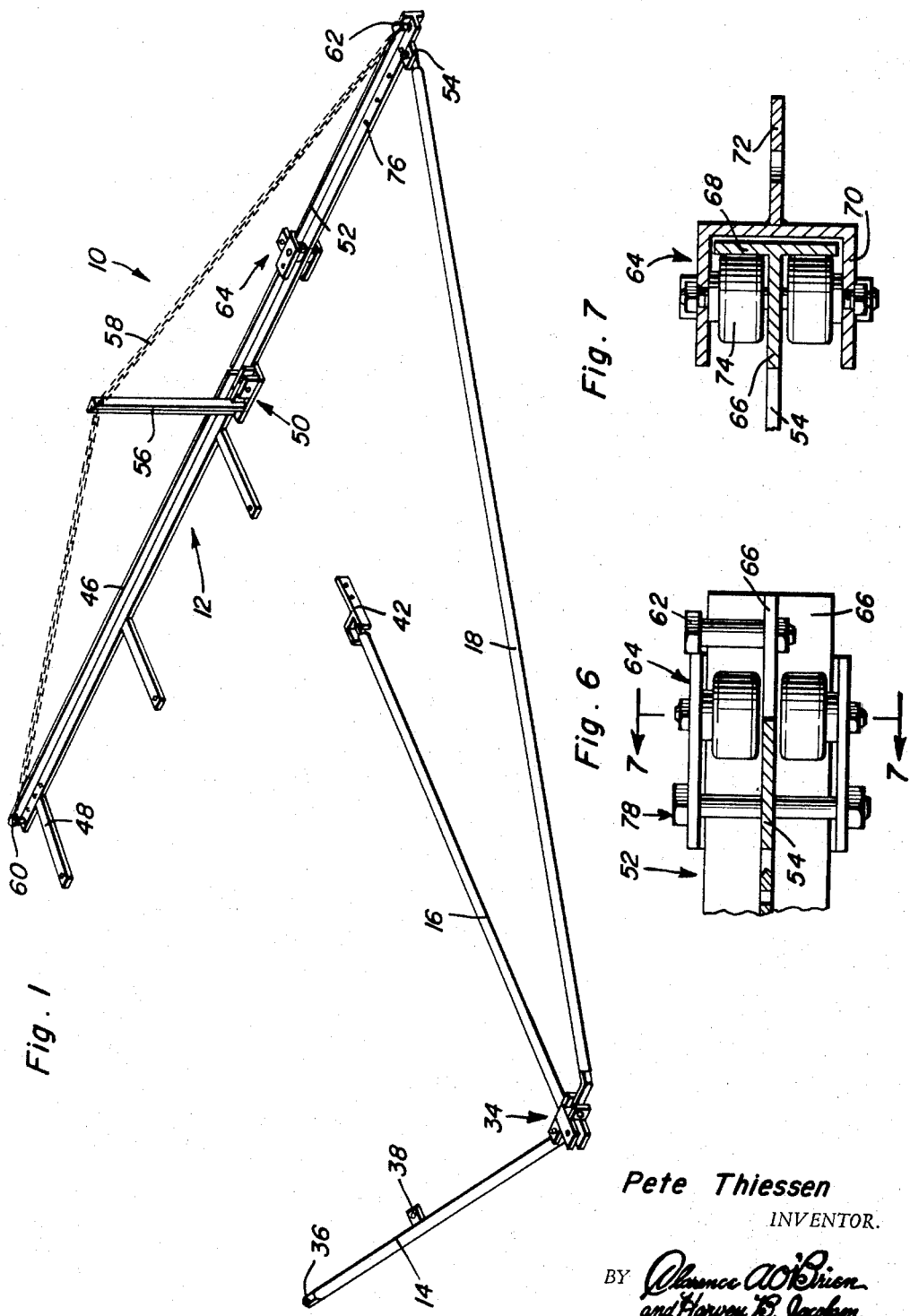

United States Patent Office 3,415,541
Patented Dec. 10, 1968

3,415,541
TANDEM HITCH
Pete Thiessen, Nye Road, Meade, Kans. 67864
Filed May 25, 1967, Ser. No. 641,267
10 Claims. (Cl. 280—413)

ABSTRACT OF THE DISCLOSURE

A hitch system for grain drills towed in tandem by a tractor. A drawbar having a lateral hinged extension is fixed to one grain drill and slidably mounts a pivot assembly to which the other grain drill is connected at a laterally adjusted location either on the fixed section of the drawbar or the hinged extension. Hitch links couple the drawbar mounting grain drill to the tractor with the hinged extension either folded or unfolded.

Background of the invention

This invention relates to the coupling of trailing implements such as grain drills, mowers, harrows, harvesters and other agricultural devices to a towing vehicle or tractor, the trailing implements being towed either aligned with each other in the forward direction of travel or in laterally offset relation to each other during operation of the implements.

Coupling systems for two or more trailing implements adapted to be towed by a tractor vehicle are well known. Such coupling or hitch devices are however relatively complex in construction, difficult to attach and adjust in accordance with different requirements. In some cases, the coupling devices themselves must be supported by wheels because of their bulk, weight and size. In other cases, a considerable amount of effort is required in order to change the relative positions of the implements being towed between aligned and laterally offset positions.

Summary of the invention

In accordance with the present invention, the hitch coupling system involves relatively few parts which are arranged in a novel relationship so as to effect a change in the relative position of the trailing implements with little effort. More particularly, lateral shift of one trailing implement relative to the other between aligned and laterally offset positions is effected by turning the towing vehicle in one direction or the other from the forward direction of movement. Once the lateral shift is effected, the trailing implements may be locked in position relative to each other.

Another feature of the hitch device of the present invention resides in a foldable drawbar through which the trailing implements are interconnected with each other. The drawbar is folded or unfolded when the effective length of one of the tractor coupling hitch links is changed, the hitch links coupling the tractor to that implement on which the foldable drawbar is mounted.

Another feature of the invention resides in the coupling of the trailing implements to each other and to the towing vehicle by components mounted only on one of the trailing implements so as to facilitate installation of the coupling system as well as to facilitate changing of the lateral relationship between the trailing implements.

These together with other objects and advantages which will become subsequently apparent reside in the details of construction and operation as more fully hereinafter described and claimed, reference being had to the accompanying drawings forming a part hereof, wherein like numerals refer to like parts throughout.

Brief description of the drawing figures

FIGURE 1 is a perspective view showing the components which make up the hitch coupling system of the present invention.

FIGURE 2 is a top plan view showing the installation of the coupling system hitching a pair of trailing implements in aligned tandem relation to a towing vehicle.

FIGURE 3 is a front elevational view of the arrangement shown in FIGURE 2.

FIGURE 4 is a top plan view showing the trailing implements hitched to the towing vehicle in laterally offset relation to each other.

FIGURE 5 is a front elevational view of the arrangement shown in FIGURE 4.

FIGURE 6 is an enlarged partial sectional view taken substantially through a plane indicated by section line 6—6 in FIGURE 4.

FIGURE 7 is a partial transverse sectional view taken substantially through a plane indicated by section line 7—7 in FIGURE 6.

FIGURE 8 is a sectional view showing a modification of the arrangement illustrated in FIGURE 7.

FIGURE 9 is an enlarged partial sectional view taken substantially through a plane indicated by section line 9—9 in FIGURE 4.

FIGURE 10 is an enlarged partial sectional view taken substantially through a plane indicated by section line 10—10 in FIGURE 4.

Preferred embodiment of the invention

Referring now to the drawings in detail, and initially to FIGURE 1, it will be observed that the hitch device of the present invention is generally referred to by reference numeral 10. The hitch device includes a drawbar assembly generally referred to by reference numeral 12 to which a linkage arrangement is connected consisting of a pair of hitch links 14 and 16 and a connecting rod 18. The hitch device is adapted to be mounted on one trailing implement for direct coupling to the towing vehicle. The other trailing implement is then coupled to the drawbar assembly 12.

Referring now to FIGURES 2 through 5, it will be observed that the trailing implement 20 directly coupled to the towing vehicle 22 is in the form of a grain drill supported above the ground by a pair of wheels 24 and a dirigible wheel assembly 25 rotatable about a vertical axis adjacent the apex of a pair of forwardly extending frame members 26 from which a pivot bracket 28 extends to one of the hitch links 14. The other trailing implement 30 is identical to the implement 20 but its pivot bracket is connected to the drawbar assembly 12 mounted on the trailing implement 20. As shown in FIGURES 2 and 3, the implements 20 and 30 are aligned with each other in the direction of travel in which they are towed by the vehicle 22. This arrangement of the trailing implements relative to the towing vehicle will permit movement of the implements along a relatively narrow road to or from the fields. FIGURES 4 and 5 on the other hand show the trailing implements being towed in laterally offset relation to each other. The trailing implements are arranged in this laterally offset relationship during a seed sowing operation in order to sow seeds along a relatively wide swath. It will of course be appreciated that other agricultural implements may be hitched to the tractor for performing other operations such as tilling and working the soil.

As hereinbefore indicated, all of the components associated with the hitch device 10 are mounted on the trailing implement 20 including the hitch links 14 and 16 and connecting rod 18 pivotally connected to a rearwardly extending coupling portion 32 of the towing vehicle by means of a pivotal mounting assembly generally referred to by reference numeral 34. The hitch link 16 is rigidly connected to the mounting assembly 34 which is pivotally connected to the towing vehicle about a vertical axis and is also pivotally connected about a vertical axis to the hitch link 14. Accordingly, the hitch links 14 and 16 are angularly related to each other in a horizontal plane. The connecting rod 18 on the other hand is pivotally connected to the mounting assembly 34 about a horizontal axis and is accordingly adapted to be pivotally displaced relative to the links 14 and 16 in a vertical plane.

The hitch link 14 as hereinbefore indicated is pivotally connected to the forward pivot bracket 28 of the trailing implement 20. However, its effective length may be varied by changing the location on the link to which the pivot bracket 28 is connnected. Thus, the hitch link 14 is provided with a pivot portion 36 at its end opposite the end to which the mounting assembly 34 is connected and a second pivot portion 38 intermediate the ends of the link. The implement 20 is therefore pivotally connected to the link 14 at its pivot portion 36 as shown in FIGURE 4 when the implements are in laterally offset relation to each other whereas the implement 20 is connected to the pivot portion 38 of the link 14 when the implements are aligned with each other as shown in FIGURE 2. The length of the hitch link 16 however remains fixed. The end of the hitch link 16 opposite the mounting assembly 34 is pivotally connected by means of a pin 40 to the pivot bracket 42 as more clearly seen in FIGURE 10, the pivot bracket being secured to the frame of the implement 20. A slot 44 is formed at the end of the hitch link 16 through which the pin 40 extends so as to accommodate angular displacement of the hitch link relative to the implement 20 between the positions shown in FIGURES 2 and 4. In this regard, it will be appreciated that when the effective length of the hitch link 14 is changed, the angular relationship of the hitch links to each other and to the implement 20 are also changed. Also, the angular relationship of the connecting rod 18 is changed as seen from a comparison between FIGURES 2 and 4. When the effective length of the hitch link 14 is maximum as shown in FIGURE 4, the implement 20 extends laterally of the towing vehicle while the connecting rod 18 extends laterally of the hitch link 16 in a direction opposite to link 14 and is substantially aligned with the hitch links 14 and 16 in the same horizontal plane. When the effective length of the hitch link 14 is sohrtened as shown in FIGURE 2, the implement 20 is then laterally shifted toward the longitudinal axis of the towing vehicle while the connecting rod 18 is pivotally displaced upwardly and laterally toward a position substantially above the hitch link 16. This movement of the connecting rod 18 effects folding of the drawbar assembly 12.

As more clearly seen in FIGURE 1, the drawbar assembly 12 includes a fixed section 46 secured to the implement 20 by a plurality of connecting bars 48. The fixed section of the drawbar is thereby fixedly mounted on one lateral side of the implement and mounts a hinge assembly 50 to which a movable extension 52 is pivotally connected. The extension 52 is adapted to be pivotally displaced about a horizontal axis between a folded, upright position as illustrated in FIGURES 2 and 3, and an extended, horizontal position aligned with the fixed section as shown in FIGURES 1, 4 and 5. The end of the hinged extension 52 remote from the hinge assembly 50, is therefore pivotally connected to the connecting rod 18 by means of the pivot portion 54. Also rigidly mounted on the fixed section 46 of the drawbar adjacent to the hinge assembly 50, is an upright post 56 to which a flexible cable 58 is connected intermediate the ends thereof. The ends of the cable are anchored to the remote ends of the fixed and movable sections of the drawbar by means of stop bolt assemblies 60 and 62. These stop bolt assemblies also function to limit movement of a pivot assembly 64 slidably mounted on the drawbar assembly.

The drawbar assembly includes a track formation by means of which the pivot assembly 64 is slidably mounted, the pivot assembly being pivotally connected to the trailing implement 30 so as to accommodate lateral adjustment of its position relative to the implement 20. In one form of the invention so far, the track formation associated with the drawbar assembly includes the web 66 and base 68 of a T-cross-section. The pivot assembly 64 in this form of the invention includes a channel-shaped member 70 as more clearly seen in FIGURE 7 to which the pivotal connecting member 72 is welded in order to pivotally connect the pivot assembly to the pivot bracket of the implement 30. A pair of guide rollers 74 are rotatably mounted by the legs of the channel member 70 and bear against the base 68 of the track formation. The web of the track formation adjacent the ends of the drawbar assembly mount the stop bolts 60 and 62 so as to prevent disassembly of the pivot assembly 64 from the drawbar as shown in FIGURE 6. It will also be observed, that the web 66 of the track formation is provided with a plurality of apertures 76 adjacent the ends of the drawbar assembly in order to lock the pivot assembly 64 at a plurality of adjustable locations on either the fixed section 46 or the movable extension 52. A removable lock bolt assembly 78 is provided for this purpose extending between the sides of the channel member 70 as shown in FIGURE 6. A modified track formation 70' is shown in FIGURE 8 associated with a pivot assembly 64' whereby the guide rollers 74' may be enclosed within the track formation. It will also be apparent, that the pivot assembly is slidably displaceable between the fixed and movable sections of the drawbar assembly only when the movable section is in its extended position as shown in FIGURES 1, 4 and 5.

In order to effect a change in the lateral relationship between the trailing implements, the lock bolt 78 is removed from the pivot assembly 64 in order to free it for sliding movement along the drawbar assembly. The hinge extension 52 is displaced to its extended position if it is not already in such position by increasing the effective length of the hitch link 14 as aforementioned. By simply turning the towing vehicle 22 in one direction or the other from the forward direction of movement, the pivot assembly 64 will move toward one end or the other of the drawbar assembly. The pivot assembly may then be locked in an adjusted position adjacent the end of the drawbar assembly either on the fixed section 46 or the movable section 52. Thus, the change may be effected in an effortless manner.

What is claimed as new is as follows:

1. In combination with at least two trailing implements adapted to be towed by a towing vehicle in a forward direction, a convertible hitch comprising, a pair of hitch links pivotally connected to the towing vehicle about a vertical axis in angular relation to each other, a connecting rod pivotally connected to the towing vehicle about a horizontal axis adjacent to said hitch links, means pivotally connecting said hitch links at spaced locations to one of said trailing implements for towing the same in laterally and rearwardly spaced relation to the towing vehicle, a drawbar fixedly mounted by said one of the trailing implements having a fixed section and a movable section pivotally connected to the connecting rod, means for varying the effective length of one of said hitch links to displace the movable section of the drawbar between a folded position and an extended position projecting laterally from said one of the trailing implements, pivot means connected to the other of the trailing implements and movably mounted by the drawbar for displacement between said fixed and movable sections thereof in response to turning of the towing vehicle, and means for locking the pivot means to the fixed section or movable section in the extended position thereof to respectively tow the other of the trailing vehicles in aligned tandem and laterally offset relation to said one of the trailing implements.

2. The combination of claim 1 wherein said means for varying the length of said one of the hitch links includes at least two pivot portions formed on said hitch link in spaced relation to each other alternatively connected to said one of the trailing implements at one of said spaced locations thereon.

3. The combination of claim 2 wherein said movable section of the drawbar is hingedly connected to the fixed section, said drawbar mounting a track on said sections, said track being straight in the extended position of the movable section for displacement of the pivot means slidably mounted by the track between the two sections of the drawbar.

4. The combination of claim 3 including a vertical post secured to the fixed section of the drawbar and flexible means interconnecting said post with both sections of the drawbar for absorbing shock during movement of the trailing implements in laterally offset relation to each other.

5. The combination of claim 1 wherein said movable section of the drawbar is hingedly connected to the fixed section, said drawbar mounting a track on said sections, said track being straight in the extended position of the movable section for displacement of the pivot means slidably mounted by the track between the two sections of the drawbar.

6. The combination of claim 5 including a vertical post secured to the fixed section of the drawbar and flexible means interconnecting said post with both sections of the drawbar for absorbing shock during movement of the trailing implements in laterally offset relation to each other.

7. The combination of claim 1 including a vertical post secured to the fixed section of the drawbar and flexible means interconnecting said post with both sections of the drawbar for absorbing shock during movement of the trailing implements in laterally offset relation to each other.

8. The combination of claim 7 wherein said means for varying the length of said one of the hitch links includes at least two pivot portions formed on said hitch link in spaced relation to each other alternatively connected to said one of the trailing implements at one of said spaced locations thereon.

9. In combination with at least two trailing implements adapted to be towed by a towing vehicle in a forward direction, a convertible hitch comprising: a foldable drawbar connected to one of the trailing implements said drawbar having a fixed section and a hinged section folded to an upright position and unfolded to a horizontal position aligned with the fixed section, pivot means connecting the other of the trailing implements to the drawbar in laterally adjustable relation on the hinged and fixed sections, linkage means connecting the towing vehicle to said one of the trailing implements and the drawbar for folding or unfolding the drawbar, and means for locking the pivot means to the drawbar at adjusted locations, along the hinged and fixed sections.

10. The combination of claim 9 wherein said linkage means includes a pair of hitch links pivotally connected to the towing vehicle about a vertical axis in angular relation to each other, a connecting rod pivotally connected to the towing vehicle about a horizontal axis adjacent to said hitch links, means pivotally connecting said hitch links at spaced locations to said one of said trailing implements for towing the same in laterally and rearwardly spaced relation to the towing vehicle and means for varying the effective length of one of said hitch links to fold or unfold the drawbar.

References Cited
UNITED STATES PATENTS

| | | | |
|---|---|---|---|
| 1,599,923 | 9/1926 | Reuber | 280—412 |
| 1,762,919 | 6/1930 | Drabek | 280—411 |
| 2,081,083 | 5/1937 | Beebe | 280—411 |
| 2,512,097 | 6/1950 | Goodspeed | 280—413 |

LEO FRIAGLIA, Primary Examiner.

U.S. Cl. X.R.

280—491